(12) United States Patent
O'Connor et al.

(10) Patent No.: US 8,044,431 B2
(45) Date of Patent: Oct. 25, 2011

(54) MICRODISPLAY PACKAGING SYSTEM

(75) Inventors: Michael O'Connor, Cupertino, CA (US); Thomas W. Springett, San Francisco, CA (US); Paul C. Ward-Dolkas, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 12/132,183

(22) Filed: Jun. 3, 2008

(65) Prior Publication Data

US 2008/0233667 A1 Sep. 25, 2008

Related U.S. Application Data

(62) Division of application No. 10/750,308, filed on Dec. 31, 2003, now Pat. No. 7,397,067.

(51) Int. Cl.
H01L 23/48 (2006.01)
H01L 31/00 (2006.01)

(52) U.S. Cl. ............... 257/178; 257/59; 257/440

(58) Field of Classification Search ............ 257/59, 257/178, 440
See application file for complete search history.

(56) References Cited

U.S. PATENT DOCUMENTS

| | | | |
|---|---|---|---|
| 4,827,118 A * | 5/1989 | Shibata et al. | 257/432 |
| 4,905,021 A | 2/1990 | Iizuka et al. | |
| 5,118,361 A | 6/1992 | Fraas et al. | |
| 5,223,741 A * | 6/1993 | Bechtel et al. | 257/678 |
| 5,508,740 A | 4/1996 | Miyaguchi et al. | |
| 5,600,148 A | 2/1997 | Cole et al. | |
| 5,919,329 A | 7/1999 | Banks et al. | |
| 5,973,391 A * | 10/1999 | Bischoff et al. | 257/678 |
| 5,997,152 A | 12/1999 | Taninaka et al. | |
| 6,081,305 A | 6/2000 | Sato et al. | |
| 6,187,605 B1 | 2/2001 | Takasu et al. | |
| 6,198,166 B1 * | 3/2001 | Coronati | 257/738 |
| 6,228,675 B1 * | 5/2001 | Ruby et al. | 438/106 |
| 6,388,888 B1 * | 5/2002 | Seko et al. | 361/767 |
| 6,494,371 B1 | 12/2002 | Rekow et al. | |
| 6,556,261 B1 | 4/2003 | Krusius et al. | |
| 6,556,269 B1 | 4/2003 | Takiar et al. | |
| 6,590,346 B1 | 7/2003 | Hadley et al. | |
| 6,610,997 B2 | 8/2003 | Murade | |
| 6,614,103 B1 * | 9/2003 | Durocher et al. | 257/678 |
| 6,639,714 B2 | 10/2003 | Smith et al. | |
| 6,720,206 B2 | 4/2004 | Choi | |
| 6,773,958 B1 | 8/2004 | Wang | |
| 6,816,385 B1 | 11/2004 | Alcoe | |
| 6,825,059 B2 | 11/2004 | Fossum | |
| 6,849,916 B1 * | 2/2005 | Glenn et al. | 257/434 |
| 6,864,944 B1 * | 3/2005 | Scattergood et al. | 349/156 |
| 6,891,194 B2 | 5/2005 | Izumi | |
| 6,894,853 B2 | 5/2005 | Haskett et al. | |
| 6,933,604 B2 | 8/2005 | Sakamoto et al. | |
| 6,975,512 B1 | 12/2005 | Ooi | |

(Continued)

*Primary Examiner* — James Mitchell
(74) *Attorney, Agent, or Firm* — Buckley, Maschoff & Talwalkar LLC

(57) ABSTRACT

Some embodiments provide a microdisplay integrated circuit (IC), a substantially transparent protective cover coupled to the microdisplay IC, and a base coupled to the microdisplay IC. Thermal expansion characteristics of the base may be substantially similar to thermal expansion characteristics of the protective cover. According to some embodiments, at least one set of imaging elements is fabricated on an upper surface of a semiconductor substrate, and a base is affixed to a lower surface of the semiconductor substrate to generate substantially negligible mechanical stress between the semiconductor substrate and the base.

25 Claims, 17 Drawing Sheets

U.S. PATENT DOCUMENTS

| | | |
|---|---|---|
| 7,034,785 B2 | 4/2006 | Koma |
| 7,329,861 B2 * | 2/2008 | Ma et al. .................. 250/239 |
| 7,361,940 B2 * | 4/2008 | Kim et al. .................. 257/99 |
| 2001/0030725 A1 | 10/2001 | Shinohara et al. |
| 2002/0000630 A1 | 1/2002 | Coyle |
| 2002/0004251 A1 | 1/2002 | Roberts et al. |
| 2002/0101557 A1 | 8/2002 | Ono et al. |
| 2002/0149312 A1 | 10/2002 | Roberts et al. |
| 2002/0163006 A1 | 11/2002 | Yoganandan et al. |
| 2003/0034566 A1 * | 2/2003 | Jimarez et al. ............ 257/778 |
| 2003/0095116 A1 | 5/2003 | Koyama |
| 2003/0136962 A1 | 7/2003 | Miyajima et al. |
| 2003/0160256 A1 * | 8/2003 | Durocher et al. ............ 257/88 |
| 2003/0213956 A1 | 11/2003 | Hioki et al. |
| 2004/0016995 A1 * | 1/2004 | Kuo et al. .................. 257/678 |
| 2004/0041222 A1 * | 3/2004 | Loh ........................... 257/433 |
| 2004/0080034 A1 * | 4/2004 | Satomi et al. ............. 257/678 |
| 2004/0084778 A1 | 5/2004 | Hosoda et al. |
| 2004/0097005 A1 * | 5/2004 | Daniels ....................... 438/99 |
| 2004/0136146 A1 * | 7/2004 | Saitoh et al. ............. 361/600 |
| 2004/0197967 A1 | 10/2004 | Chen |
| 2004/0222516 A1 | 11/2004 | Lin et al. |
| 2004/0234213 A1 | 11/2004 | Narayan et al. |
| 2005/0045974 A1 | 3/2005 | Hellekson et al. |
| 2005/0052606 A1 | 3/2005 | Lee et al. |
| 2005/0062167 A1 | 3/2005 | Huang et al. |
| 2005/0077616 A1 | 4/2005 | Ng et al. |
| 2005/0087754 A1 | 4/2005 | Erchak |
| 2005/0093134 A1 | 5/2005 | Tarn |
| 2005/0121768 A1 | 6/2005 | Edelstein et al. |
| 2006/0055864 A1 | 3/2006 | Matsumura et al. |
| 2006/0205102 A1 | 9/2006 | French et al. |
| 2009/0032925 A1 * | 2/2009 | England .................... 257/680 |

* cited by examiner

MICRODISPLAY PACKAGING SYSTEM

CROSS REFERENCE TO RELATED APPLICATION

This is a divisional of co-pending prior U.S. patent application Ser. No. 10/750,308, filed Dec. 31, 2003.

BACKGROUND

A microdisplay integrated circuit (IC) includes a two-dimensional array of pixel cells formed on a semiconductor substrate. Each pixel cell may be adapted to control an electric field across an associated portion of liquid crystal material. The electric field may be modulated to change a state of the liquid crystal material in order to produce an image pixel of a desired pixel intensity for a given image frame. Current microdisplay IC packages attempt to protect microdisplay IC components and to provide an environment for proper operation thereof.

DETAILED DESCRIPTION

Figure 1:
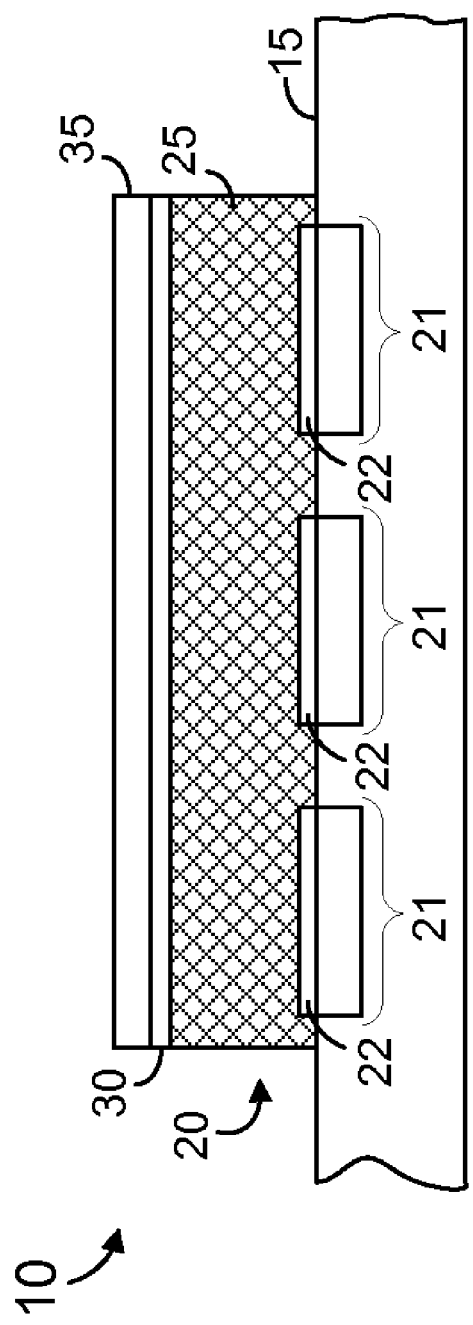
FIG. 1 is a schematic side cross-sectional view of a microdisplay IC according to some embodiments.

FIG. 1 is a schematic side cross-sectional view of a portion of microdisplay IC 10 according to some embodiments. Microdisplay IC 10 is a Liquid Crystal on Silicon (LCoS) device, but embodiments are not limited thereto. Rather, embodiments may be implemented with Liquid Crystal Diode (LCD) devices, Digital Micromirror Display (DMD) devices, or devices using any other suitable microdisplay technology.

Microdisplay IC 10 includes semiconductor substrate 15. Substrate 15 may comprise single-crystal silicon or any other semiconductor substrate within which integrated electrical devices may be fabricated. In this regard, pixel cell array 20 is fabricated within the upper layers of semiconductor substrate 15. Pixel cell array 20 may be fabricated using currently- or hereafter-known masking, etching, and deposition techniques.

FIG. 1 shows three pixel cells 21 within pixel cell array 20. Pixel cells 21 may be arranged in a two-dimensional grid of equally-spaced pixel cells. In some embodiments the two-dimensional grid may include thousands of pixel cells 21 on a side. Each pixel cell 21 of the grid may correspond to a single image pixel of microdisplay IC 10.

Each pixel cell 21 is associated with a pixel electrode 22. Pixel electrode 22 may comprise a reflective material such as aluminum for reflecting light incident thereto. One pixel electrode 22 may be used to selectively apply a voltage signal, or potential, to a region of light switching layer 25 with which it is in contact. In this regard, light switching layer 25 may comprise a layer of liquid crystal of any suitable type.

According to some embodiments, pixel electrodes 22 comprise an array of micromirrors, and light switching layer 35 may comprise air. Pixel electrodes 22 themselves may operate to switch light in such embodiments.

Electrode 30 may contact light switching layer 25 to complete an electric circuit to carry current through a voltage source (not shown), pixel cell 21, pixel electrodes 22, light switching layer 25, electrode 30, and back to the voltage source. In some embodiments, electrode 30 comprises Indium Tin Oxide.

As shown in FIG. 1, electrode 30 is disposed between light switching layer 25 and substantially transparent protective cover 35. Cover 35 may comprise glass coated with an anti-reflective material to increase a percentage of incident light that passes through cover 35 and on to switching layer 25.

For purposes of the present description, microdisplay 10 will be described as including elements 15 through 30. Additionally, elements 20 through 30 will be generally referred to as imaging elements. A microdisplay IC according to some embodiments may comprise less or more imaging elements than shown in FIG. 1.

In operation, a pixel cell 21 of pixel cell array 20 generates a voltage on an associated pixel electrode 22. The voltage is applied to a region of light switching layer 25 that is in contact with the associated pixel electrode 22. The applied voltage may, in conjunction with a voltage signal applied to electrode 30, create an electric field across the region of light switching layer 25. More specifically, a strength of the electric field is based on a potential difference between the applied potential and a potential of electrode 30. The region of light switching layer 25 reacts to the electric field according to its characteristic behavior.

In this regard, each region of light switching layer 25 may operate as an electrically-activated light filter. When subjected to a weak or no electric field, a region may impart no polarization rotation to light that is received through cover 35, thereby preventing the light from passing to the reflective surface of a pixel electrode 22 that is in contact with the region. When subjected to a stronger electric field, the region may rotate light received through cover 35 forty-five degrees as it passes through the region of light switching layer 25. The light then reflects off the reflective surface of the pixel electrode 22 and is rotated an additional forty-five degrees as it passes back through the region before exiting cover 35. A percentage of incoming light that is reflected back through cover 35 can therefore be varied by varying the strength of the electric field.

According to some embodiments, each region of light switching layer 25 controls an intensity of light returned through cover 35 based on the strength of an applied electric field. Some embodiments of light switching layer 25 direct light received through cover 35 using other techniques.

To form an image using microdisplay IC 10, a desired intensity is determined for each pixel of the image. Electric field intensities that correspond to the desired image pixel intensities are then applied to regions of light switching layer 25 that correspond to the image pixels. As a result, any light that is incident to cover 35 will reflect off of pixel electrodes 22 and exit from cover 35 toward an observer in accordance with the desired pixel intensities. Microdisplay IC 10 may display a moving image by rapidly displaying successive images. In such a case, the successive images may be referred to as image frames.

The intensities of pixels displayed by microdisplay IC 10 therefore depend in part upon the strength of the electric fields applied across corresponding regions of light switching layer 25. The strength of these fields depends in part on a distance between electrode 30 and pixel electrodes 22 that are in contact with the corresponding regions. This distance may be specified by the design of microdisplay IC 10. In a case that this distance is outside of designed tolerances for one or more pixels, pixel intensities displayed by microdisplay IC 10 may not correspond to desired pixel intensities.

The distance between one or more of pixel electrodes 22 and electrode 30 may fall outside of the designed tolerances if microdisplay IC is mechanically distorted. For example, some conventional systems bond the substrate of a microdisplay IC directly to a substantial chip carrier. The chip carrier may possess a coefficient of thermal expansion (CTE) that differs significantly from the CTE of the microdisplay IC. Heat generated by the microdisplay IC during operation may cause the chip carrier to expand at a different rate than the microdisplay IC, thereby causing mechanical distortion of the microdisplay IC.

Figure 2:
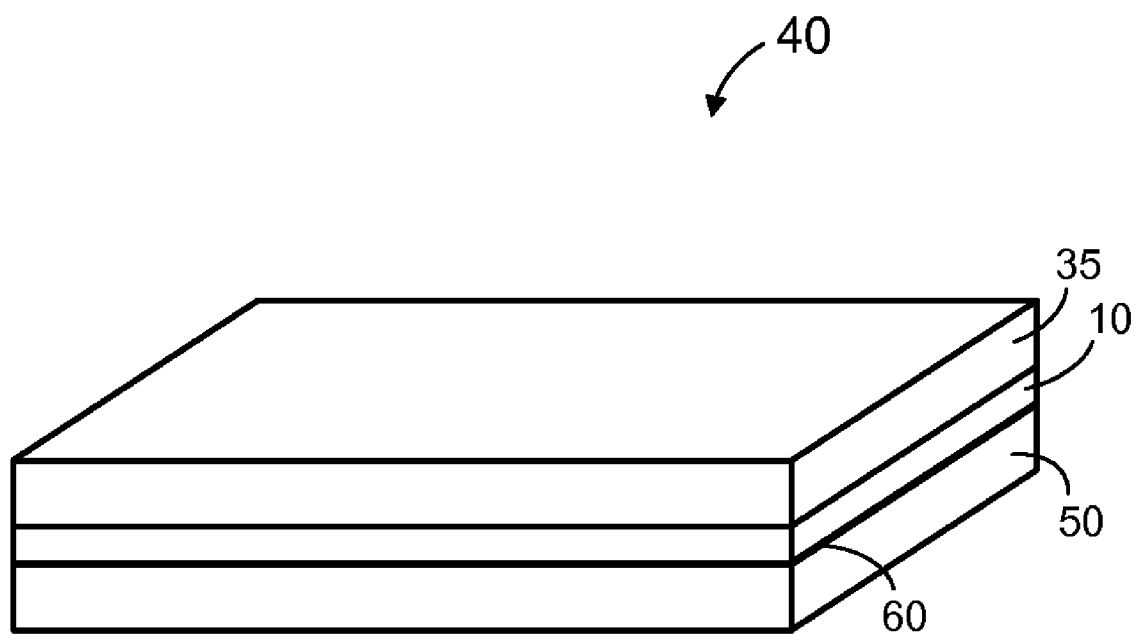
FIG. 2 is a plan view of a microdisplay IC package according to some embodiments.

FIG. 2 is a plan view of a microdisplay IC package according to some embodiments. Package 40 includes microdisplay IC 10 and base 50. Base 50 may comprise a material having a CTE that substantially matches the CTE of cover 35. The material may be substantially identical to the material of cover 35. Moreover, a thickness of base 50 may substantially match a thickness of cover 35. In some embodiments, base 50 may reduce a mechanical distortion of microdisplay IC 10 by increasing a stiffness of microdisplay IC 10. Moreover, base 50 may increase mechanical isolation between microdisplay IC 10 and a chip carrier to which package 40 may be mounted.

Bonding agent 60 may couple microdisplay IC 10 to base 50. Bonding agent 50 may comprise one or more of thermal epoxy, thermal tape, thermal grease, thermal phase change material, and any other suitable bonding agent. Bonding agent 60 may be applied to one or both of a lower surface of substrate 15 and an upper surface of base 50 to couple microdisplay IC 10 to base 50.

Figure 3A:
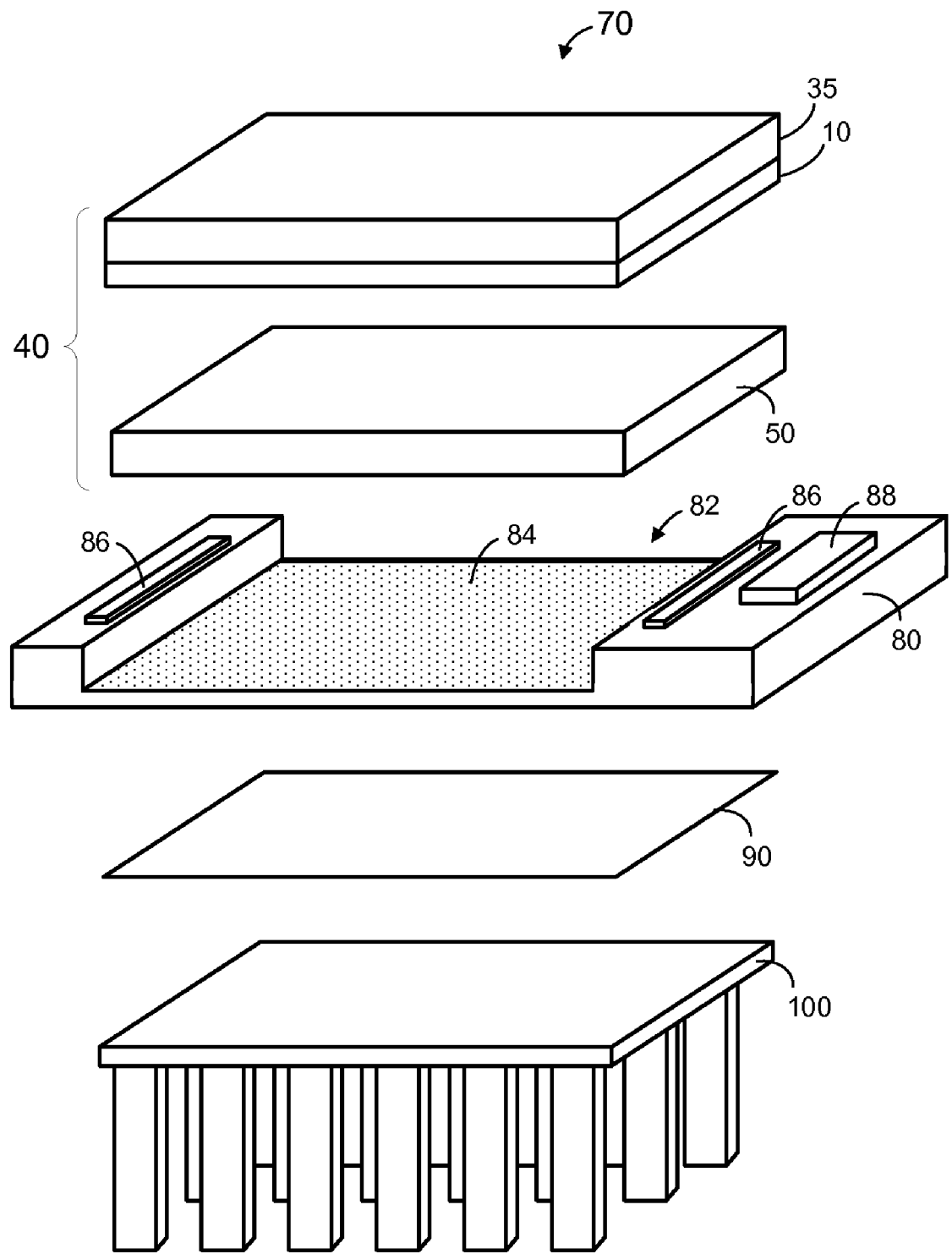
FIG. 3A is an exploded view of a microdisplay IC package according to some embodiments.

FIG. 3A is an exploded view of microdisplay IC packaging according to some embodiments. Packaging 70 includes cover 35 and microdisplay IC 10, base 50, chip carrier 80, bonding agent 90, and heat sink 100. Packaging 70 may provide efficient heat dissipation and mechanical isolation of microdisplay IC 10 during operation thereof.

As described with respect to FIG. 2, base 50 may be coupled to microdisplay IC 10 using any suitable bonding agent. Base 50 may be coupled chip carrier 80 using any suitable bonding agent, including but not limited to thermal epoxy, thermal tape, and thermal grease.

Chip carrier 80 may comprise ceramic and/or organic material. A material of chip carrier 80 may possess a CTE similar to that of semiconductor substrate 15. In some embodiments, the CTE of base 50 matches the CTE of semiconductor substrate 15 more closely than the CTE of chip carrier 80 matches the CTE of semiconductor substrate 15. Chip carrier 80 defines recess 82. Foot 84 bounds a bottom of recess 82. Foot 84 and chip carrier 80 may be composed of identical or different materials.

Recess 82 is adapted to receive packaging 40. Packaging 40 may mount within recess 82 via any bonding agent mentioned herein. In some embodiments, packaging 40, and more particularly base 50, is coupled to foot 84. The material of carrier 80 may provide a low thermal resistance path for cooling packaging 40 during operation. The material may also be yielding so as to absorb mechanical deflections of packaging 40. According to some embodiments, foot 84 is substantially less thick than packaging 40 and therefore the stiffness of packaging 40 dominates the stiffness of foot 84 when subjected to mechanically distorting forces.

Chip carrier 80 also includes conducting pads 86 for transmitting electrical signals to the imaging elements of microdisplay IC 10. Conducting pads 86 may be soldered onto chip carrier 80 and may also be fabricated thereon. In some embodiments, wire bonds couple conducting pads 86 to the imaging elements of microdisplay IC 10.

Control chip 88 may include driving elements for driving the imaging elements of microdisplay IC 10. Control chip 88 may also include an interface to an external source for receiving pixel image data from the source. The interface may also be used to receive and transmit signals used to synchronize the operation of microdisplay IC 10 with other elements of a display system.

Bonding agent 90 is depicted as thermal tape but may comprise any other agent for coupling heat sink 100 to chip carrier 80. Bonding agent 90 may contact at least a portion of foot 84 and heat sink 100. In such a case, a high thermal conductivity path may be established between microdisplay IC 10 and heat sink 100. Moreover, bonding agent 90 may provide mechanical isolation of microdisplay 10 from any differential expansion of heat sink 100.

Figure 3B:
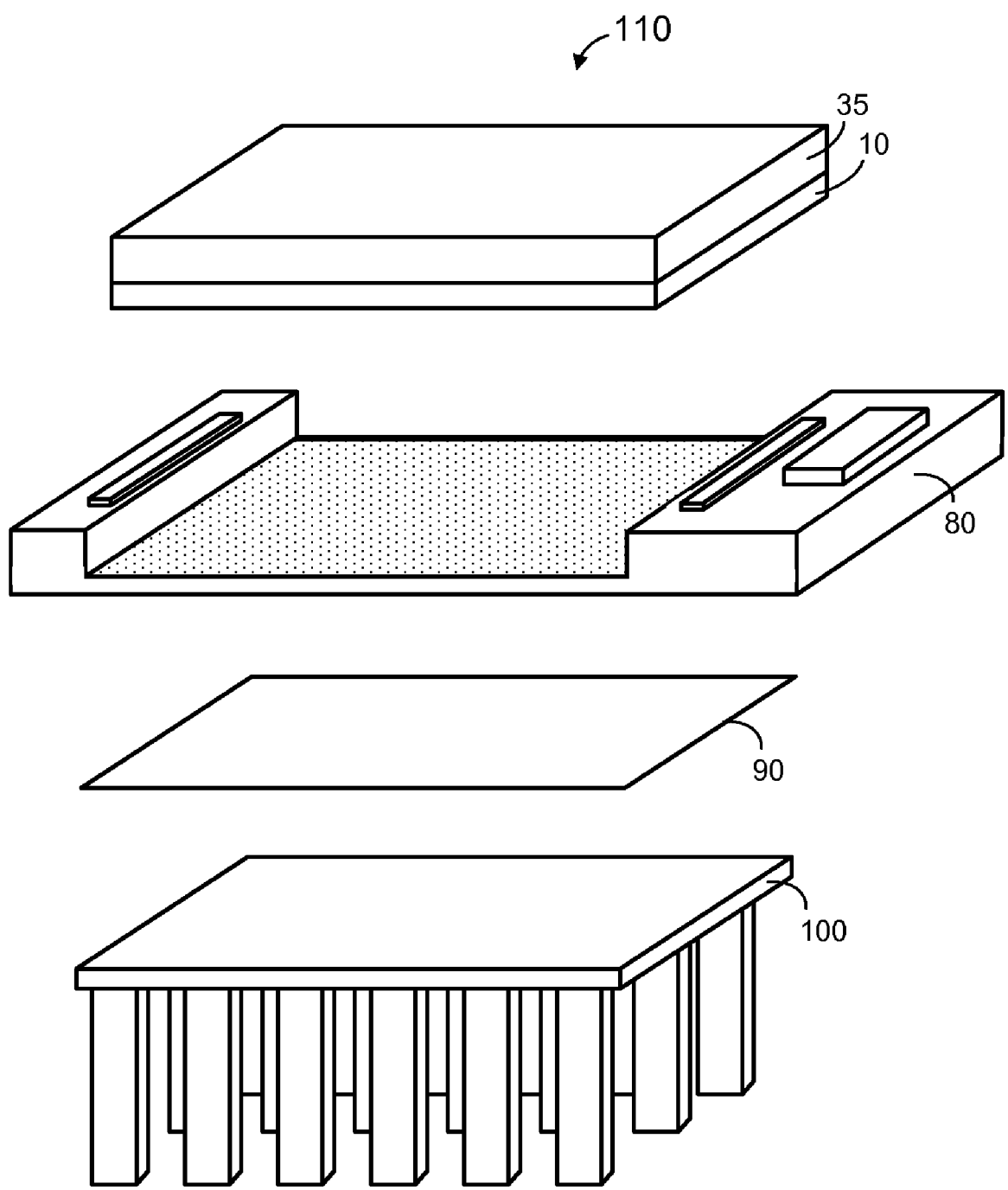
FIG. 3B is an exploded view of a microdisplay IC package according to some embodiments.

FIG. 3B is an exploded view of packaging 110 according to some embodiments. Packaging 110 may be identical to packaging 70 except for the exclusion of base 50. Accordingly, a lower surface of semiconductor substrate 15 is coupled directly to foot 84, perhaps with only a bonding agent therebetween. Such embodiments may provide more efficient heat dissipation than embodiments such as packaging 70.

Figure 4:
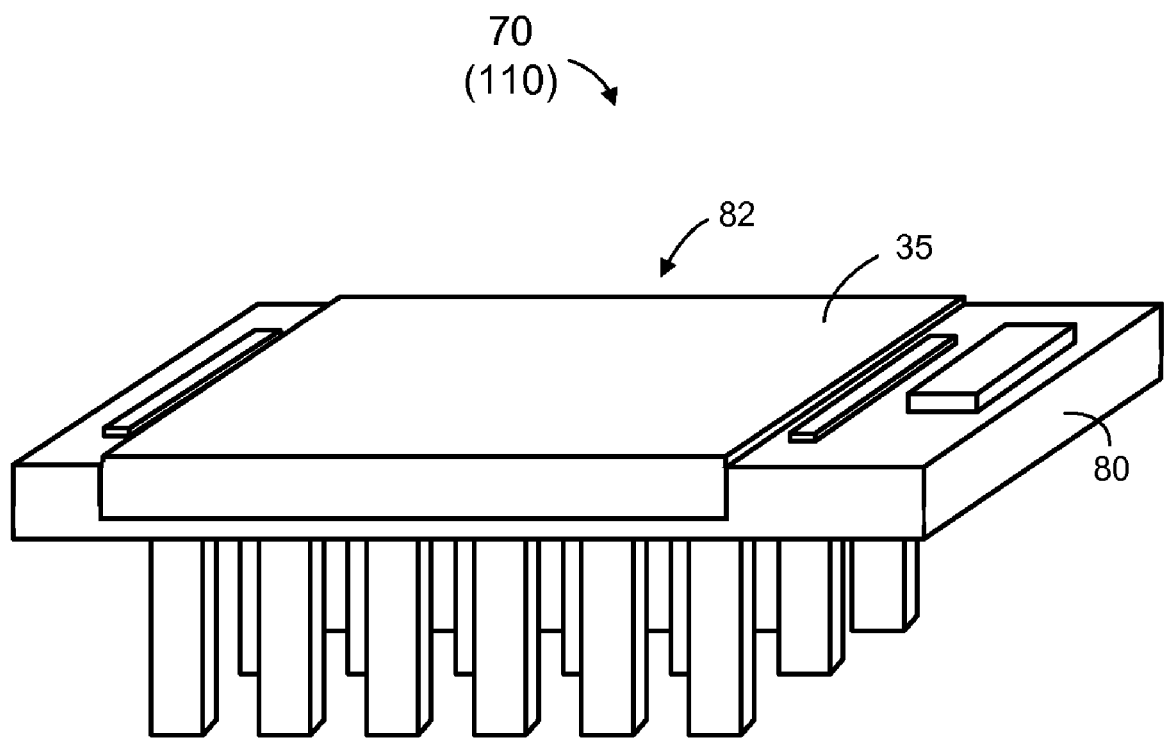
FIG. 4 is a plan view of a microdisplay IC package according to some embodiments.

FIG. 4 is an outward view of packaging 70 and/or packaging 110 according to some embodiments. Protective cover 35 is shown protruding from recess 82 of chip carrier 80. In some embodiments, protective cover 35 is substantially flush with an upper surface of chip carrier 80, while in other embodiments cover 35 is recessed beneath the upper surface of chip carrier 80. Cover 35 may completely protrude from recess 82, with an upper surface of microdisplay IC 10 being flush with or extending above the upper surface of chip carrier 80.

Figure 5A:
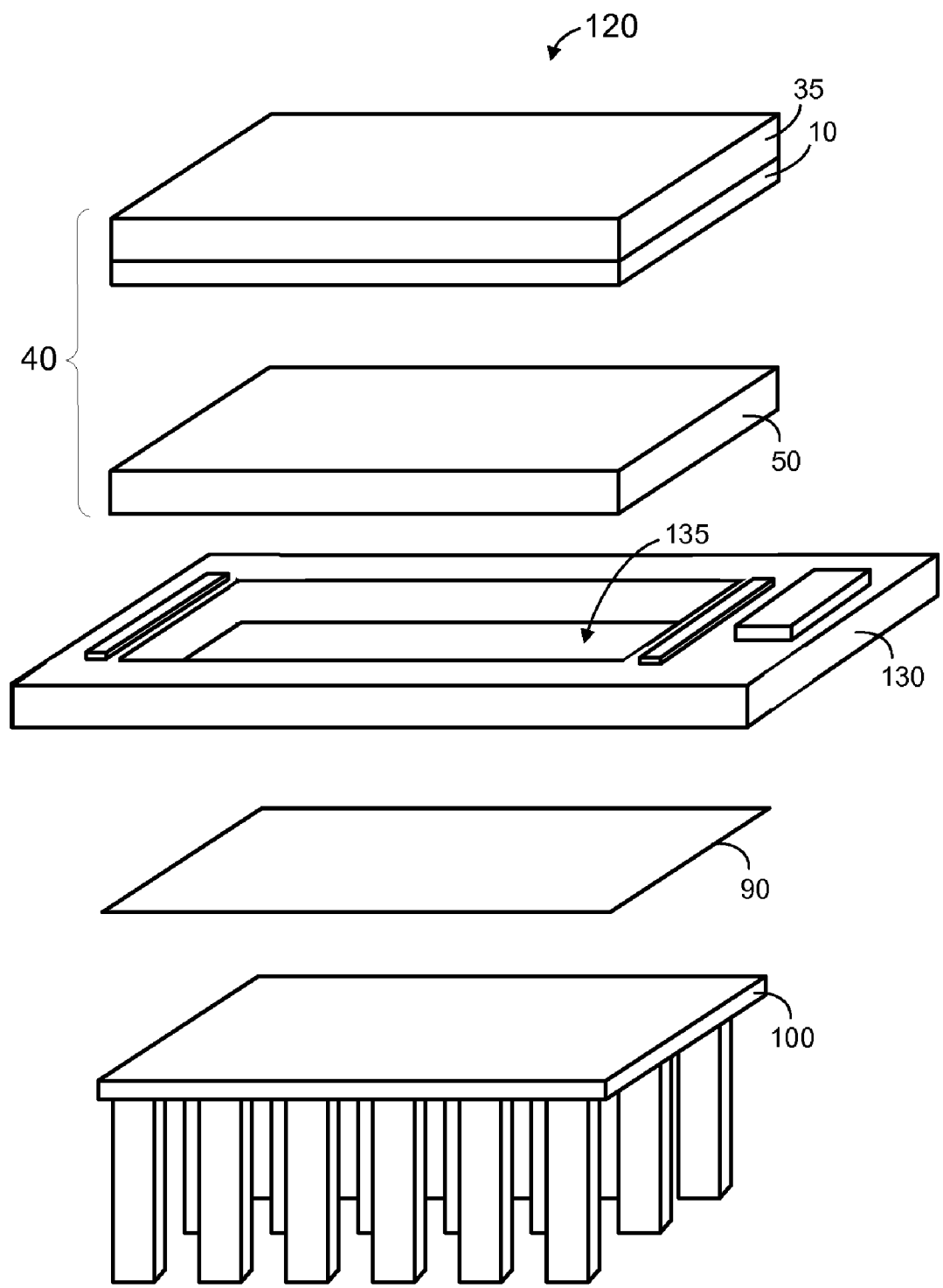
FIG. 5A is an exploded view of a microdisplay IC package according to some embodiments.

FIG. 5A is an exploded view of packaging 120 according to some embodiments. Elements of packaging 120 correspond to similarly-numbered elements described above.

Packaging 120 includes chip carrier 130, which in turn defines opening 135. Other elements of chip carrier 120 except may be identical to elements of chip carrier 80. Packaging 40 may be mounted within opening 135 via friction, a bonding agent, and/or mechanical elements (not shown). Bonding agent 90 may be coupled directly to base 50 and to heat sink 100, thereby possibly providing more efficient heat dissipation than some embodiments such as packaging 70.

Figure 5B:
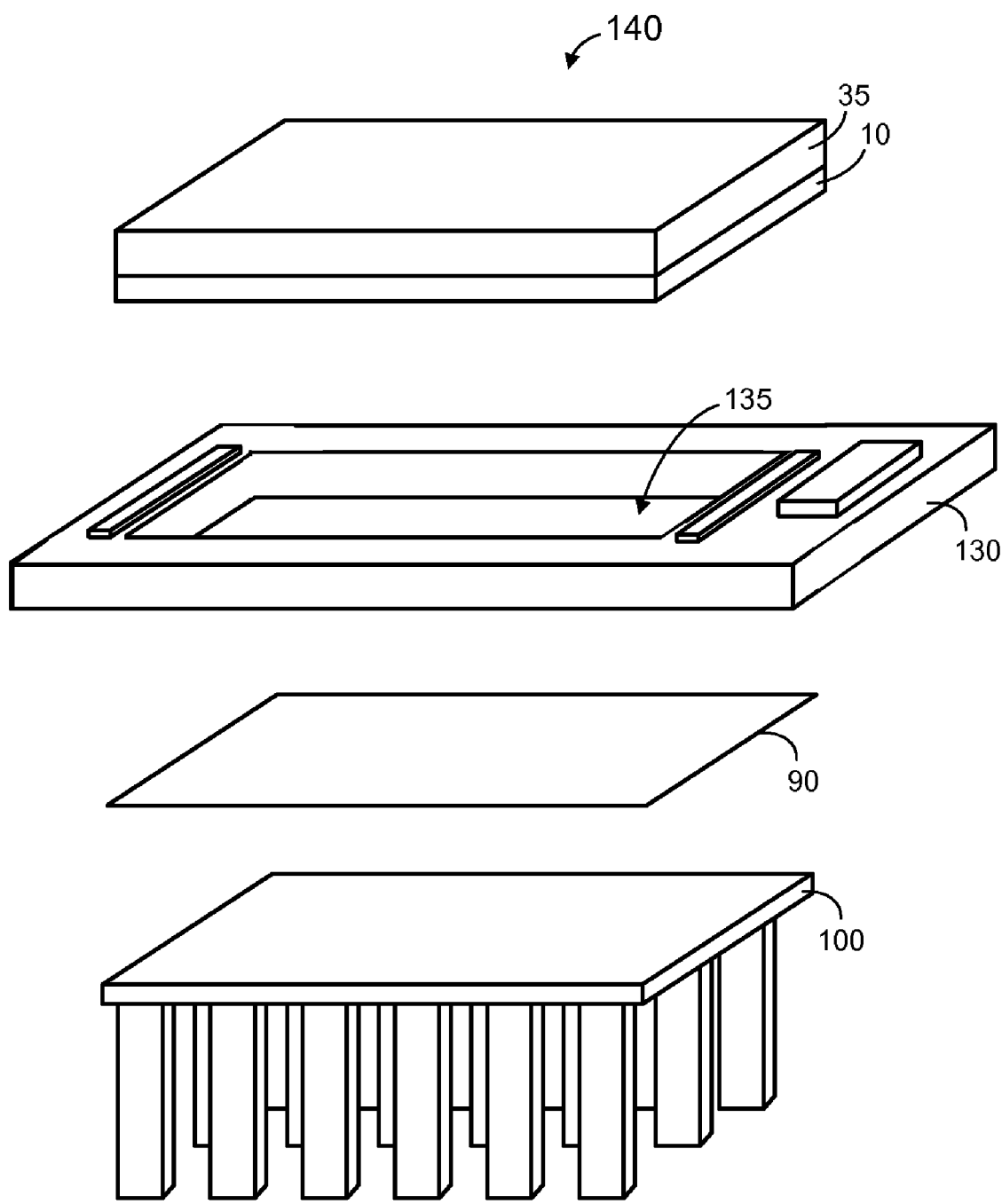
FIG. 5B is an exploded view of a microdisplay IC package according to some embodiments.

FIG. 5B is an exploded view of packaging 140 according to some embodiments. Packaging 140 may consist of elements similar to those of packaging 120, excepting base 50. Therefore, a lower surface of semiconductor substrate 15 is coupled directly to heat sink 100 by bonding agent 90.

Figure 6:
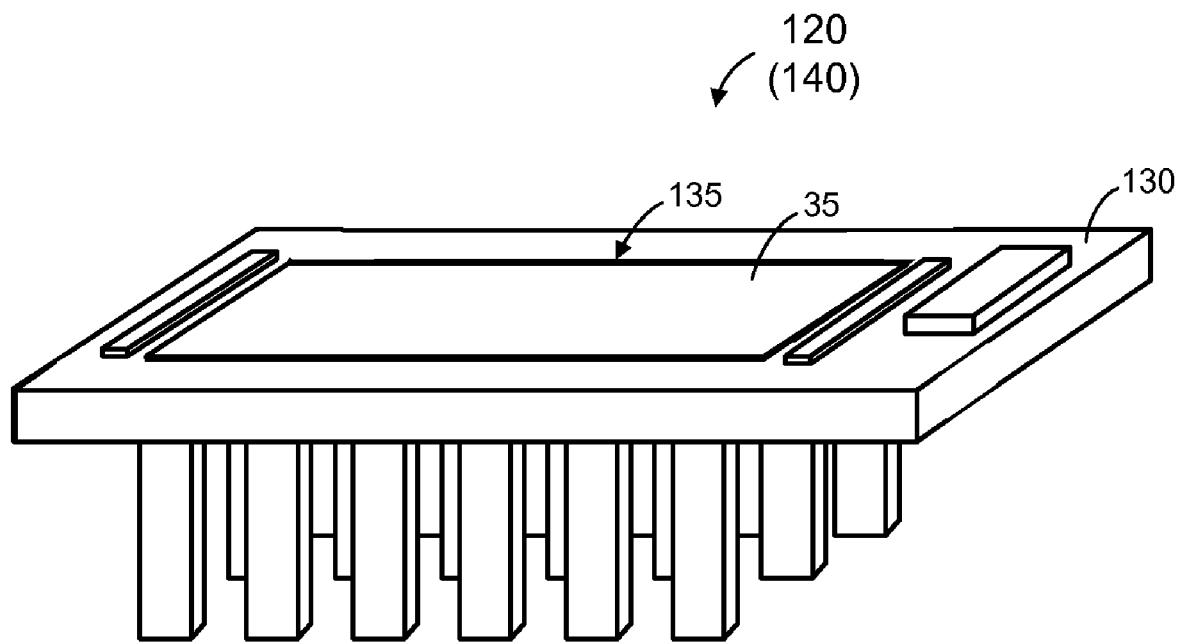
FIG. 6 is a plan view of a microdisplay IC package according to some embodiments.

FIG. 6 is an outward view of packaging 120 and/or packaging 140 according to some embodiments. Protective cover 35 is shown substantially flush with an upper surface of chip carrier 130. In some embodiments, protective cover 35 protrudes from opening 135 of chip carrier 130, while in other embodiments cover 35 is recessed beneath the upper surface of chip carrier 130. As described with respect to FIG. 4, cover 35 may completely protrude from opening 135, with an upper surface of microdisplay IC 10 being flush with or extending above the upper surface of chip carrier 130.

Figure 7:
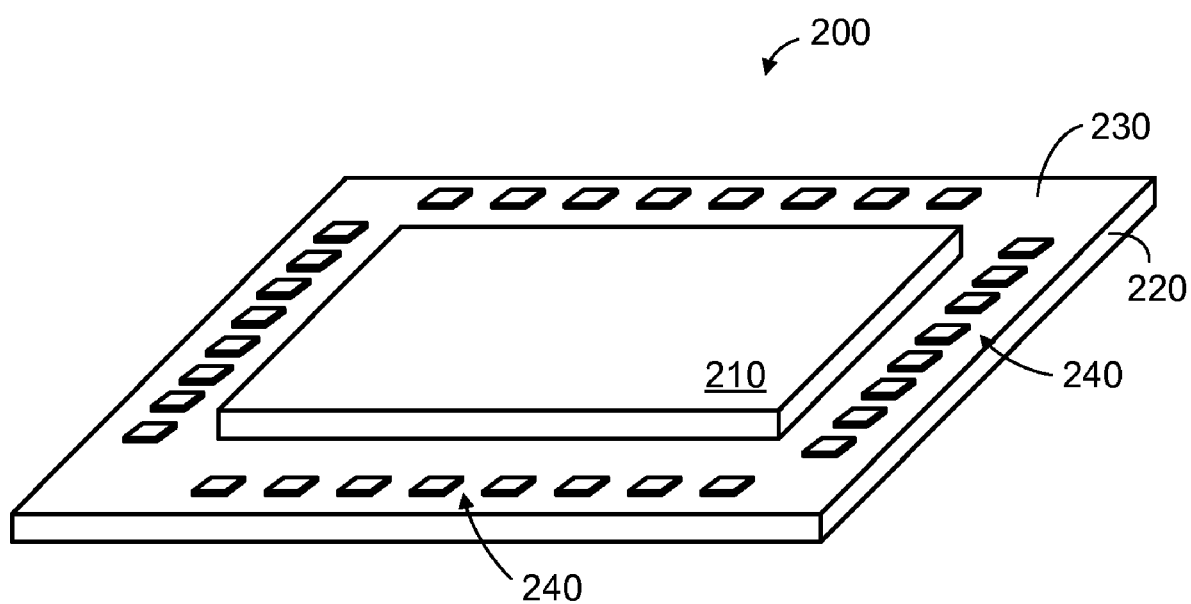
FIG. 7 is a plan view of a microdisplay IC according to some embodiments.

FIG. 7 is an outward view of a microdisplay IC according to some embodiments. Microdisplay IC 200 comprises substantially transparent protective cover 210 coupled to semiconductor substrate 220. Imaging elements may be fabricated on semiconductor substrate 220 such that an upper surface of electrode 30 is flush with an upper surface of substrate 220. Other physical arrangements may also be utilized, such as the arrangement of FIG. 1.

At least a portion of the upper surface of semiconductor substrate 220 comprises bonding surface 230. As will be described in more detail, bonding surface 230 may be coupled to an associated portion of a chip carrier. Bonding surface 230 may be coated with a material suitable for bonding microdisplay IC 200 to a chip carrier. Bonding surface 230 comprises conductors 240 to carry electrical signals to the imaging elements of microdisplay IC 200. Bonding surface 230 and conductors 240 may be fabricated onto substrate 220 using currently- or hereafter-known fabrication techniques.

Figure 8:
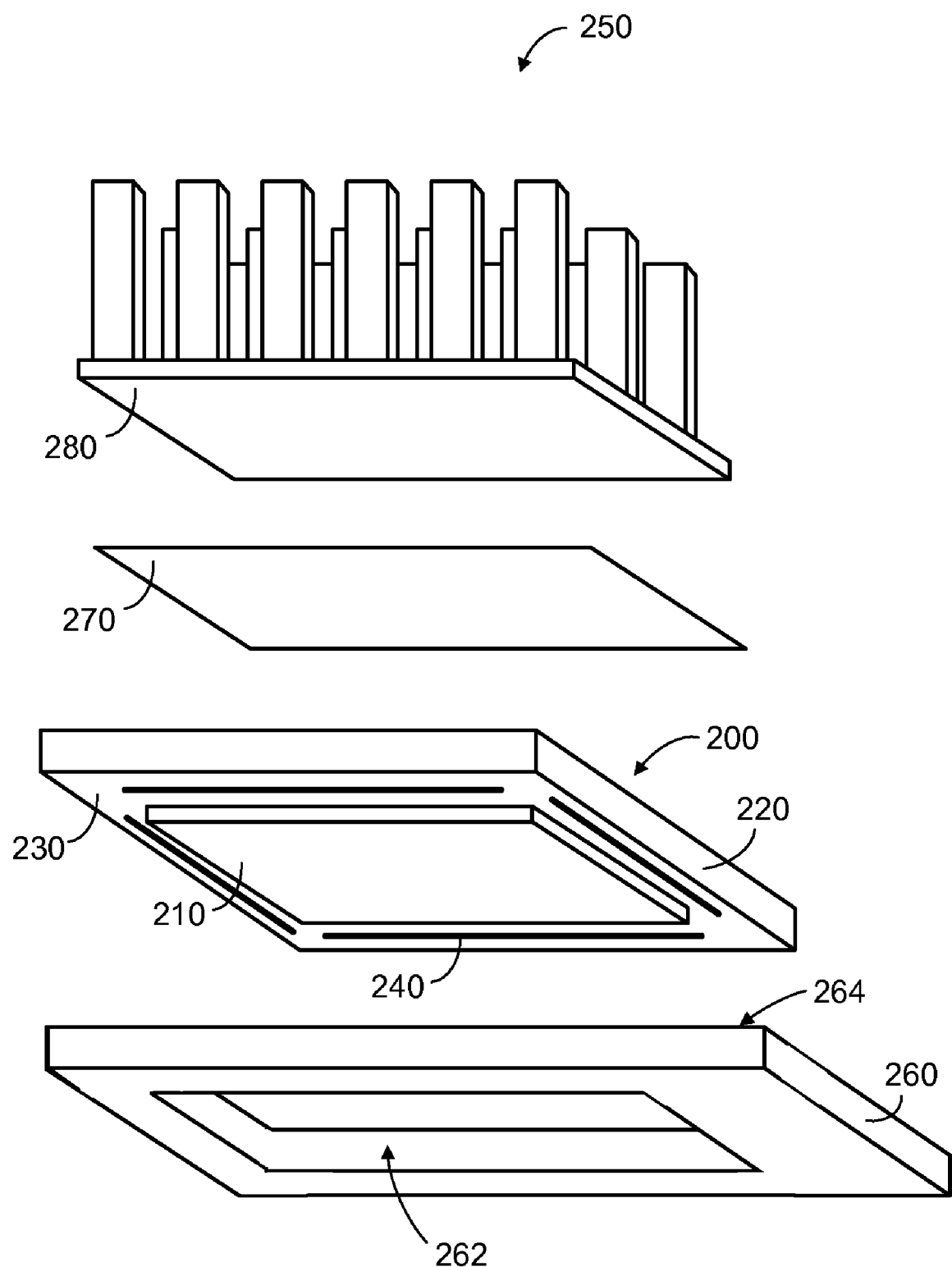
FIG. 8 is an exploded view of a microdisplay IC package according to some embodiments.

FIG. 8 is an exploded view of packaging 250 according to some embodiments. Packaging 250 comprises microdisplay IC 200, chip carrier 260, bonding agent 270 and heat sink 280. Chip carrier 260 defines opening 262. Microdisplay IC 200 may be coupled to carrier 260 such that cover 210 extends into opening 262. Chip carrier 260 may include a lip surrounding opening 262 to receive cover 210. Bonding surface 230 may contact surface 264 of carrier 260 and be coupled thereto by a bonding agent. Conductors 240 may contact associated conductors on surface 264 to allow electrical signals to travel from chip carrier 260 to imaging elements of microdisplay IC 200. Finally, bonding agent 270 may couple heat sink 280 to substrate 220.

Figure 9:
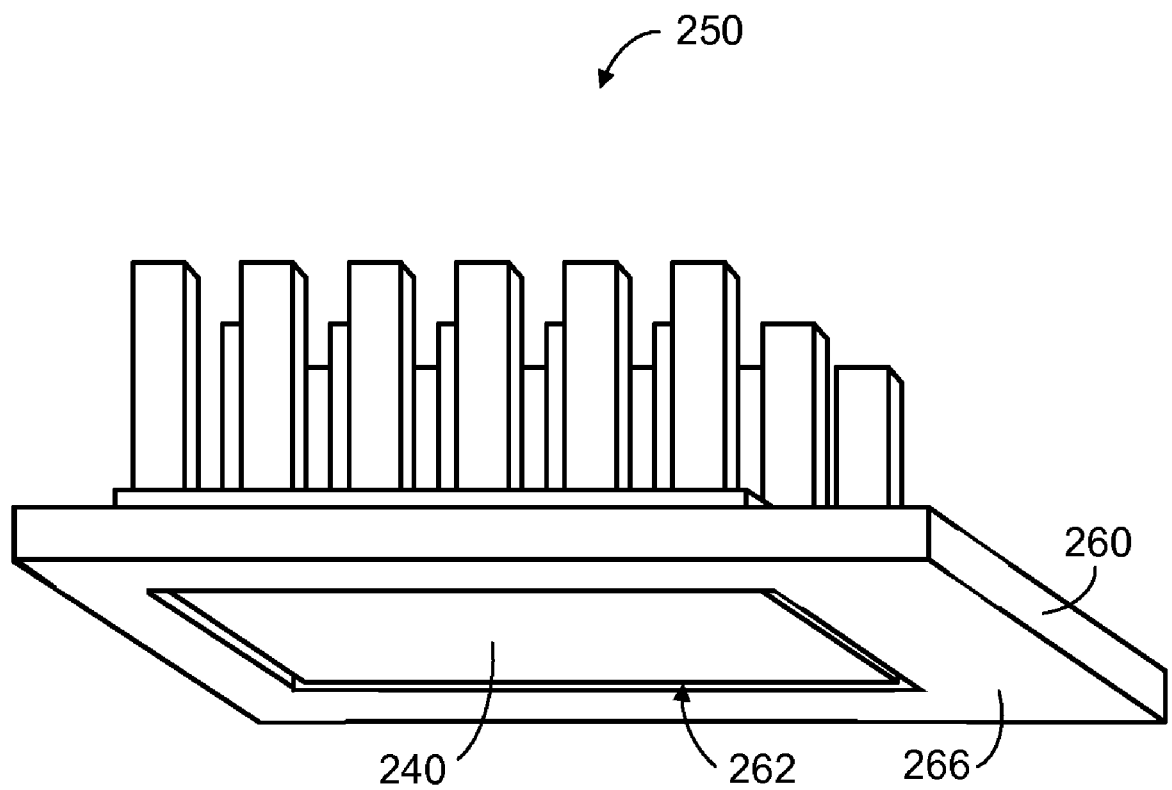
FIG. 9 is a plan view of a microdisplay IC package according to some embodiments.

FIG. 9 shows packaging 250 according to some embodiments. Cover 210 is shown extending into opening 262. According to some embodiments, cover 210 extends partially into opening 262. In other embodiments, cover 210 extends fully into opening 262 and an upper surface of cover 210 is flush with surface 266 of carrier 260. Cover 210 may alternatively extend partially through or fully through opening 262.

Figure 10:
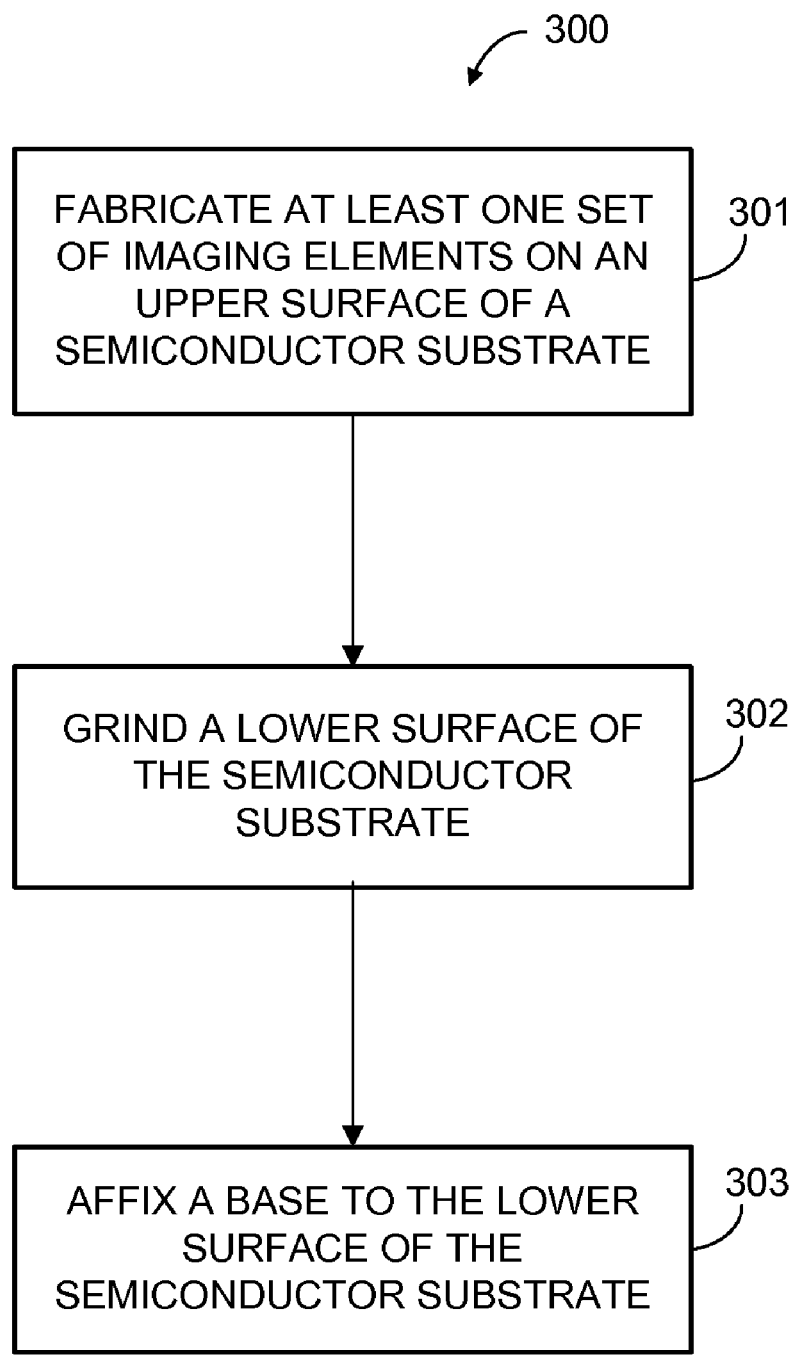
FIG. 10 is a flow diagram of a process according to some embodiments.

FIG. 10 is a flow diagram of process 300 according to some embodiments. Process 300 may be executed by manufacturing equipment and/or manually. In this regard, process 300 may be embodied in program code that is executable by manufacturing equipment. The program code may be received from any medium, including but not limited to a hard disk, an IC-based memory, a signal, and a network connection.

Initially, at 301, at least one set of imaging elements is fabricated on an upper surface of a semiconductor substrate.

Figure 11:
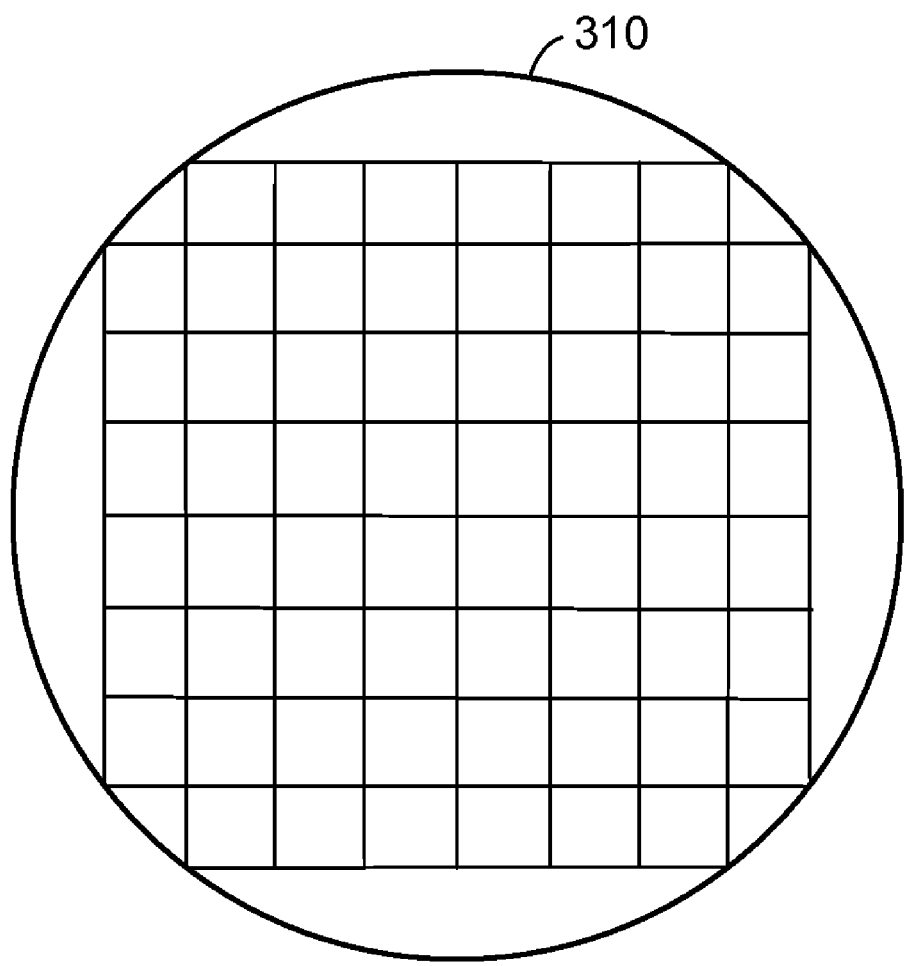
FIG. 11 is a top view of a wafer including a plurality of microdisplay ICs.

FIG. 11 is a top view of semiconductor wafer 310 on which sixty sets of imaging elements were fabricated according to 301. Each set of imaging elements may correspond to a single microdisplay IC, and each microdisplay IC includes a semiconductor substrate that is part of wafer 310. Wafer 310 may comprise any semiconductor substrate on which circuit elements may be fabricated, and portions of wafer 310 may be integrated within the imaging elements.

A lower surface of wafer 310 is ground at 302 to reduce its thickness. In some embodiments, grinding yields a thin and relatively pliable wafer that may be 0.1 mm or less in thickness. The grinding may also allow wafer 310, which may not be flat and which may include residual mechanical stresses resulting from the fabrication process, to conform to a flat base.

Figure 12:
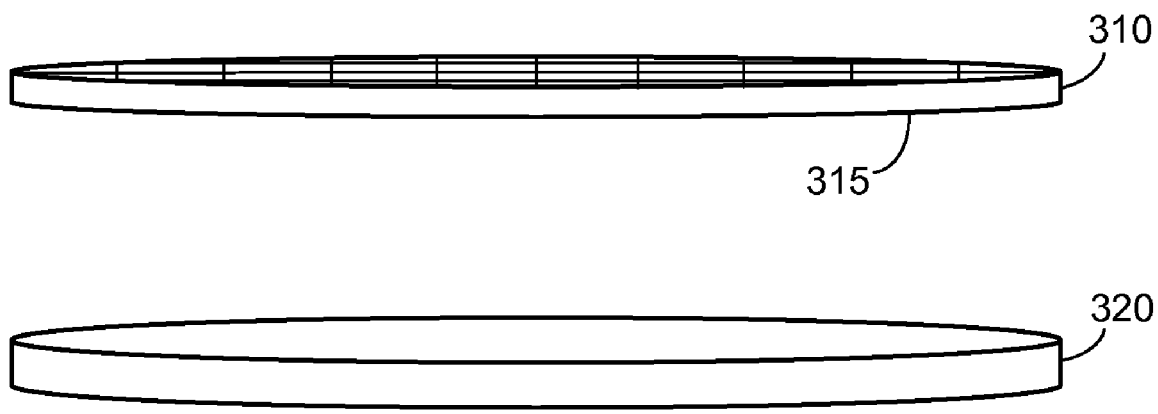
FIG. 12 is side view of a wafer and a base prior to coupling according to some embodiments.

A base is affixed to a lower surface of semiconductor wafer 310 at 303. FIG. 12 is a side view of wafer 310 and base 320 after 302 and prior to 303. Base 320 may comprise a material having a CTE that substantially matches the CTE of a substantially transparent protective cover to be coupled to the upper surface of wafer 310. The material may be substantially identical to the material of the protective cover, and/or may have a thickness substantially equal to a thickness of the cover. According to some embodiments, the cover may be coupled to wafer 310 prior to 303.

Base 320 may be affixed to wafer 310 so as to generate substantially negligible mechanical stress therebetween when the imaging elements are operated within a range of operating temperatures. According to some embodiments of this aspect, an epoxy is applied to one of base 320 and lower surface 315 of wafer 310. Base 320 and surface 315 are brought into contact with one another while at a temperature equal to at least one operating temperature of the imaging elements of wafer 3 10. When at such a temperature, wafer 310 and base 320 may expand (or contract) according to their respective CTEs. The epoxy is then cured at least one operating temperature of the imaging elements. The curing may be a partial curing, with a final curing subsequently occurring at a higher temperature.

Figure 13:
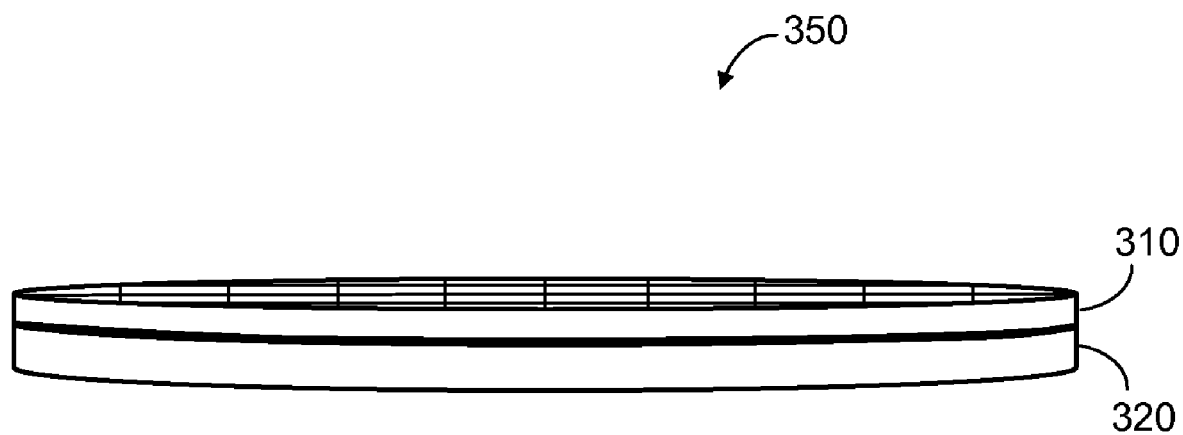
FIG. 13 is side view of a wafer and a base after coupling according to some embodiments.
Figure 14:
FIG. 14 is side view of a wafer and a base prior to coupling according to some embodiments.

Process 300 may thereby result in unit 350 of FIG. 13. Unit 350 may appear as shown when at the at least one operating temperature. Moreover, the sixty individual sub-units that may be formed by dicing unit 350 may each be substantially flat and free of mechanical stresses when at the at least one operating temperature. Such flatness may provide a uniform distance between pixel electrodes 22 and electrode 30 of each sub-unit at the operating temperature.

Due to their different CTEs, the interface of wafer 310 and base 320 may be subjected to significant mechanical stresses at other temperatures. These stresses may cause the unit comprised of wafer 310 and base 320, and the individual sub-units to warp into a substantially non-flat shape.

Figure 15:
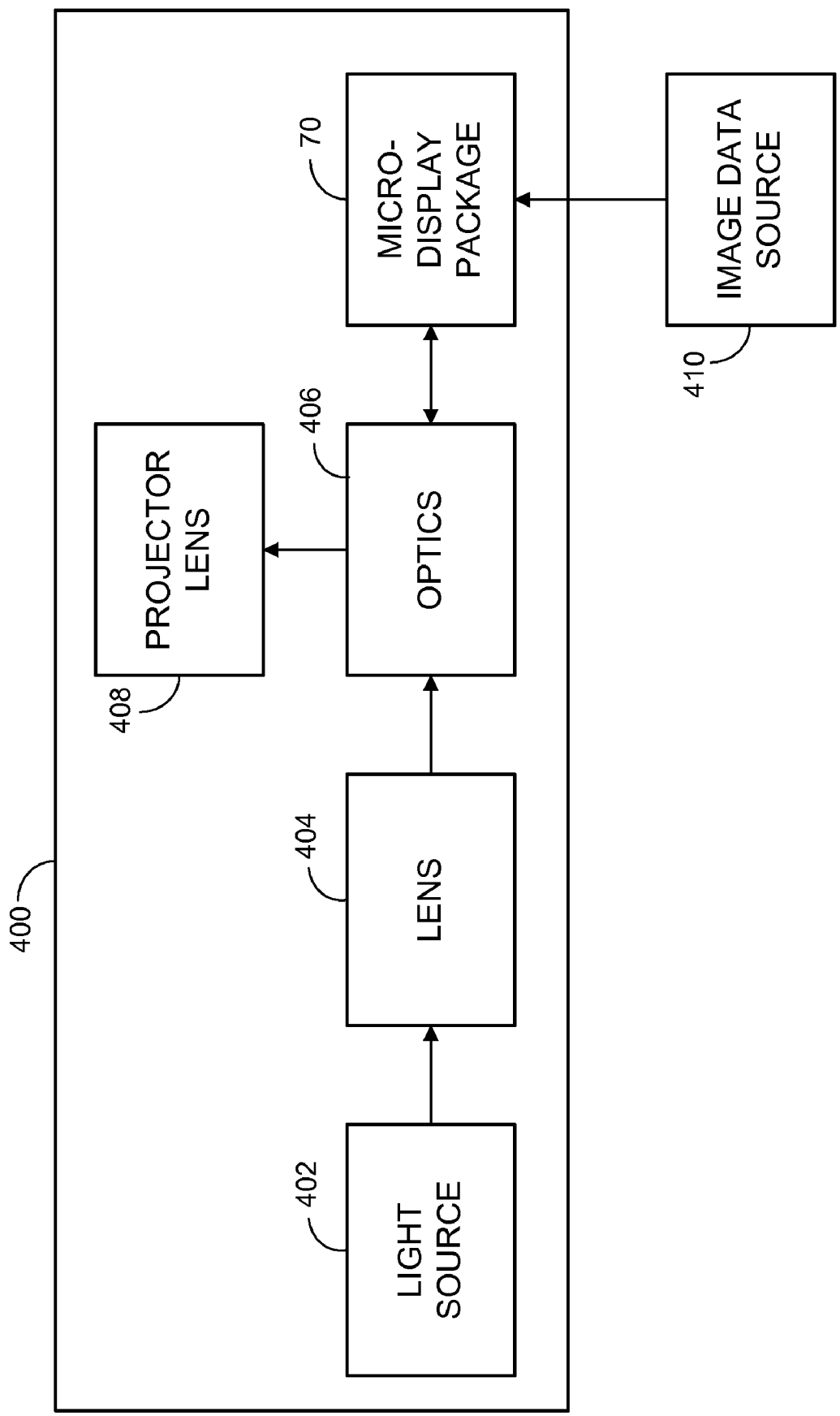
FIG. 15 is a block diagram of an image display system according to some embodiments.

According to other embodiments of 303, base 320 is affixed to wafer 310 to substantially flatten wafer 310. FIG. 15 illustrates wafer 360 that is similar to wafer 310 except for being warped due to various factors. Wafer 360 may be affixed to base 320 by applying a bonding agent therebetween and by pressing base 320 and wafer 360 together with enough force to substantially flatten wafer 360 and affix the flattened wafer to base 320. A protective cover may be coupled to an upper surface of wafer 360 after process 300.

The previously-described embodiments of 303 may be combined with the present embodiment. Particularly, wafer 360 may be affixed to base 320 while at a temperature equal to at least one operating temperature of the imaging elements of wafer 360. Such a combination may reduce an amount of mechanical stress at an interface of wafer 360 and base 320 during operation of the imaging elements.

The unit resulting from process 300 may be diced into individual sub-units comprising a microdisplay IC coupled to a portion of base 320. These units may be more mechanically rigid than prior microdisplay IC packages. Moreover, each portion of base 320 may be configured to include a flex cable interface and electrical connections for delivering signals from flex cable to the imaging elements of an associated microdisplay IC.

FIG. 15 is a block diagram of a display system according to some embodiments. Display system 400 may be used to project a color image using one or more microdisplay package(s) 70. Display system 400 comprises light source 402, lens 404, optics 406, and projector lens 408. Image data source 410 may comprise any device such as a personal computer, a television tuner, a personal digital assistant, and a digital videodisc player. Image data source 410 provides microdisplay package(s) 70 with image data for display.

Light source 402 provides light to display system 400. Light source 402 may comprise a 100 W-500 W lamp such as a metal halide lamp or an Ultra High Pressure (UHP) arc lamp. The light is received by lens 404, which transmits a uniform beam of light to optics 406. Optics 406 may include a dichroic filter for removing non-visible light from the beam of light. Optics 406 may also include one or more mirrors, color filters, and prisms for directing selected spectral bands of light to microdisplay package(s) 70.

Generally, optics 406 may project separate spectral bands of light (e.g., red, green, or blue light) to microdisplay package(s) 70. In some embodiments using three microdisplay packages 70, pixel imaging elements 25 of each microdisplay package 70 are set to imaging states that correspond to pixel intensities of red, green, or blue components of an image. Optics 406 project a corresponding spectral band onto each microdisplay package 70, receive reflected light that represents each of the three components of the image from the microdisplay packages 70, combine the reflected light into a single full-color image, and transmit the image to projector lens 408.

Projector lens 408 receives the transmitted image, which may measure less than an inch across. Projector lens 408 may magnify, focus, and project the image toward a projection screen (not shown). Display system 400 may be located on a same side of the projector screen as the intended audience (front projection), or the screen may be located between the audience and display system 400 (rear projection).

The several embodiments described herein are solely for the purpose of illustration. Embodiments may include any currently or hereafter-known versions of the elements described herein. Therefore, persons skilled in the art will recognize from this description that other embodiments may be practiced with various modifications and alterations.

What is claimed is:

1. A method comprising:
fabricating at least one set of imaging elements on an upper surface of a semiconductor substrate; and
affixing a base to a lower surface of the semiconductor substrate to generate substantially negligible mechanical stress between the semiconductor substrate and the base in a case that the imaging elements are operated within a range of operating temperatures;
wherein the at least one set of imaging elements comprises a pixel cell array and a liquid crystal layer; and
wherein affixing the base comprises:
applying an epoxy to one or both of the base and the lower surface of the semiconductor substrate;
bringing the base and the lower surface into contact with one another while at a temperature equal to at least one operating temperature of the imaging elements; and
partially curing the epoxy at least one operating temperature of the imaging elements.

2. A method according to claim 1, wherein thermal expansion characteristics of the base are substantially similar to thermal expansion characteristics of a protective cover, and wherein the imaging elements are disposed between the cover and the semiconductor substrate.

3. A method according to claim 1, wherein the pixel cell array is integrated with the semiconductor substrate and wherein the liquid crystal layer is in contact with the pixel cell array.

4. A method according to claim 3, further comprising:
coupling a protective cover to the liquid crystal layer;
wherein thermal expansion characteristics of the base are substantially similar to thermal expansion characteristics of the protective cover.

5. A method according to claim 4, further comprising:
coupling a chip carrier to the base, the chip carrier defining a recess, the base mounted within the recess.

6. A method according to claim 5, wherein the chip carrier defines an opening and wherein the protective cover extends partially into, fully into, partially through or fully through the opening.

7. A method according to claim 5, wherein the chip carrier defines an opening and wherein the base extends partially into, fully into, partially through or fully through the opening.

8. A method according to claim 7, further comprising:
coupling a heat sink to the base.

9. A method according to claim 5, further comprising:
coupling a heat sink to the chip carrier.

10. A method according to claim 1, wherein the thermal expansion characteristics of the base are different than thermal expansion characteristics of the semiconductor substrate such that an interface of the base and the semiconductor substrate would be subjected to significant mechanical stresses in a case that the imaging elements are operated within a range of operating temperatures without said affixing of the base to the lower surface of the semiconductor substrate to generate substantially negligible mechanical stress between the semiconductor substrate and the base in the case that the imaging elements are operated within a range of operating temperatures.

11. A method comprising:
fabricating at least one set of imaging elements on an upper surface of a semiconductor substrate; and
affixing a base to a lower surface of the semiconductor substrate to substantially flatten the semiconductor substrate;
wherein the at least one set of imaging elements comprises a pixel cell array and a liquid crystal layer; and
wherein affixing the base comprises:
applying an epoxy to one or both of the base and the lower surface of the semiconductor substrate;
bringing the base and the lower surface into contact with one another while at a temperature equal to at least one operating temperature of the imaging elements; and
partially curing the epoxy at least one operating temperature of the imaging elements.

12. A method according to claim 11, wherein affixing the base comprises:
affixing the base to the lower surface of the semiconductor substrate to substantially flatten the semiconductor substrate in a case that the imaging elements are operated within a range of operating temperatures.

13. A method according to claim 12, wherein the thermal expansion characteristics of the base are different than thermal expansion characteristics of the semiconductor substrate such that an interface of the base and the semiconductor substrate would be subjected to significant mechanical stresses in a case that the imaging elements are operated within a range of operating temperatures without said affixing the base to the lower surface of the semiconductor substrate to substantially flatten the semiconductor substrate in a case that the imaging elements are operated within a range of operating temperatures.

14. A method according to claim 11, wherein the thermal expansion characteristics of the base are different than thermal expansion characteristics of the semiconductor substrate such that an interface of the base and the semiconductor substrate would be subjected to significant mechanical stresses in a case that the imaging elements are operated within a range of operating temperatures without said affixing the base to the lower surface of the semiconductor substrate to substantially flatten the semiconductor substrate in a case that the imaging elements are operated within a range of operating temperatures.

15. A method according to claim 11, wherein the pixel cell array is integrated with the semiconductor substrate and wherein the liquid crystal layer is in contact with the pixel cell array.

16. A method according to claim 15, further comprising:
coupling a protective cover to the liquid crystal layer;
wherein thermal expansion characteristics of the base are substantially similar to thermal expansion characteristics of the protective cover.

17. A method according to claim 16, further comprising: coupling a chip carrier to the base, the chip carrier defining a recess, the base mounted within the recess.

18. A method according to claim 17, wherein a foot bounds a bottom of the recess, the foot having a first thickness that is substantially smaller than a thickness of the semiconductor substrate, the pixel cell array, the liquid crystal layer, the cover and the base.

19. A method according to claim 17, wherein the chip carrier defines an opening and wherein the protective cover extends partially into, fully into, partially through or fully through the opening.

20. A method according to claim 17, wherein the chip carrier defines an opening and wherein the base extends partially into, fully into, partially through or fully through the opening.

21. A method according to claim 20, further comprising: coupling a heat sink to the base.

22. A method according to claim 17, further comprising: coupling a heat sink to the chip carrier.

23. A method comprising:
fabricating at least one set of imaging elements on an upper surface of a semiconductor substrate, wherein the at least one set of imaging elements comprises a pixel cell array and a liquid crystal layer;
affixing a base to a lower surface of the semiconductor substrate to generate substantially negligible mechanical stress between the semiconductor substrate and the base in a case that the imaging elements are operated within a range of operating temperatures;
coupling a protective cover to the liquid crystal layer; and
coupling a chip carrier to the base, the chip carrier defining a recess, the base mounted within the recess;
wherein the pixel cell array is integrated with the semiconductor substrate and wherein the liquid crystal layer is in contact with the pixel cell array;
wherein thermal expansion characteristics of the base are substantially similar to thermal expansion characteristics of the protective cover; and
wherein a foot bounds a bottom of the recess, the foot having a first thickness that is substantially smaller than a thickness of the semiconductor substrate, the pixel cell array, the liquid crystal layer, the cover and the base.

24. A method comprising:
fabricating at least one set of imaging elements on an upper surface of a semiconductor substrate; and
affixing a base to a lower surface of the semiconductor substrate to generate substantially negligible mechanical stress between the semiconductor substrate and the base in a case that the imaging elements are operated within a range of operating temperatures;
wherein the at least one set of imaging elements comprises a pixel cell array and a liquid crystal layer; and
wherein the thermal expansion characteristics of the base are different than thermal expansion characteristics of the semiconductor substrate such that an interface of the base and the semiconductor substrate would be subjected to significant mechanical stresses in a case that the imaging elements are operated within a range of operating temperatures without said affixing of the base to the lower surface of the semiconductor substrate to generate substantially negligible mechanical stress between the semiconductor substrate and the base in the case that the imaging elements are operated within a range of operating temperatures.

25. A method comprising:
fabricating at least one set of imaging elements on an upper surface of a semiconductor substrate; and
affixing a base to a lower surface of the semiconductor substrate to substantially flatten the semiconductor substrate;
wherein the at least one set of imaging elements comprises a pixel cell array and a liquid crystal layer;
wherein affixing the base comprises: affixing the base to the lower surface of the semiconductor substrate to substantially flatten the semiconductor substrate in a case that the imaging elements are operated within a range of operating temperatures; and
wherein the thermal expansion characteristics of the base are different than thermal expansion characteristics of the semiconductor substrate such that an interface of the base and the semiconductor substrate would be subjected to significant mechanical stresses in a case that the imaging elements are operated within a range of operating temperatures without said affixing the base to the lower surface of the semiconductor substrate to substantially flatten the semiconductor substrate in a case that the imaging elements are operated within a range of operating temperatures.

* * * * *